(12) United States Patent
Evans et al.

(10) Patent No.: US 7,962,673 B2
(45) Date of Patent: Jun. 14, 2011

(54) METHOD AND APPARATUS FOR ACCESSING A DATA BUS TO TRANSFER DATA OVER THE DATA BUS

(75) Inventors: Charles E. Evans, Corvallis, OR (US); Douglas G. Keithley, Boise, ID (US)

(73) Assignee: Marvell International Technology Ltd., Hamilton (BM)

( * ) Notice: Subject to any disclaimer, the term of this patent is extended or adjusted under 35 U.S.C. 154(b) by 392 days.

(21) Appl. No.: 12/132,471

(22) Filed: Jun. 3, 2008

(65) Prior Publication Data

US 2008/0235475 A1    Sep. 25, 2008

Related U.S. Application Data

(63) Continuation of application No. 10/995,987, filed on Nov. 19, 2004, now Pat. No. 7,383,363.

(51) Int. Cl.
*G06F 3/00* (2006.01)
(52) U.S. Cl. .............. 710/45; 710/22; 710/25; 710/36; 710/58
(58) Field of Classification Search .............. None
See application file for complete search history.

(56) References Cited

U.S. PATENT DOCUMENTS

| | | | |
|---|---|---|---|
| 4,896,266 A | 1/1990 | Klashka et al. | |
| 5,031,097 A | 7/1991 | Kitakami et al. | |
| 5,261,072 A | 11/1993 | Siegel | |
| 5,325,489 A | 6/1994 | Mitsuhira et al. | |
| 5,517,325 A | 5/1996 | Shimatani | |
| 5,623,622 A | 4/1997 | Yuki et al. | |
| 5,809,333 A | 9/1998 | Story et al. | |
| 5,905,878 A * | 5/1999 | LaBerge | 710/114 |
| 5,905,879 A | 5/1999 | Lambrecht | |
| 6,073,223 A | 6/2000 | McAllister et al. | |
| 6,115,767 A | 9/2000 | Hashimoto et al. | |
| 6,279,063 B1 | 8/2001 | Kawasaki et al. | |
| 6,611,852 B1 | 8/2003 | Morley et al. | |
| 6,795,078 B2 | 9/2004 | Lavelle et al. | |
| 7,124,269 B2 | 10/2006 | Chuang et al. | |
| 7,539,206 B2 * | 5/2009 | Ha et al. | 370/448 |

* cited by examiner

*Primary Examiner* — Eron J Sorrell

(57) ABSTRACT

A method for intervaled memory transfer access provides periodic authorization signals to a memory access controller. The method cycles between: 1) inhibiting the memory access controller from writing data to a memory until the memory access controller receives a periodic authorization signal to cause the memory access controller to remove the inhibition and write a predetermined amount of data to the memory through a data bus, and 2) releasing the data bus following writing of the predetermined amount of data to the memory by inhibiting the memory access controller from writing further data.

11 Claims, 3 Drawing Sheets

METHOD AND APPARATUS FOR ACCESSING A DATA BUS TO TRANSFER DATA OVER THE DATA BUS

CROSS-REFERENCES TO RELATED APPLICATIONS

The present application is a continuation of U.S. Pat. No. 7,383,363, issued Jun. 3, 2008, entitled "METHOD AND APPARATUS FOR INTERVALED DMA TRANSFER ACCESS," and contains subject matter related to U.S. patent application Ser. No. 10/994,011, filed Nov. 19, 2004, by Charles Edward Evans and Douglas Gene Keithley, entitled "Method and Apparatus for DMA-Generated Memory Write-Back." The specification of said patent is hereby incorporated in its entirety for all purposes, except for those sections, if any, that are inconsistent with this specification.

BACKGROUND

The present invention relates generally to computer memory management, and more particularly to a method and apparatus for intervaled DMA transfer access.

With each new generation of computer hardware and each new generation of computer software, more and more data needs to be processed in less and less time. This is particularly true of image data and graphics systems, in which the continuing increases in data size and data rates place additional burdens on graphics memory management systems. Attempts to improve graphics system performance to meet these needs are running up against the limitations of memory systems in general, and of memory device limitations in particular.

In graphics applications, it is often desirable or necessary to read data (or a stream of data) from a source, to transfer the data to a destination, and to clear blocks of the source memory after the read operation has completed. The source memory blocks are often cleared (e.g., written with a background data pattern) in anticipation of future operations. This three-step sequential process (reading, writing, and clearing) can consume significant data bus resources.

Similar memory operation limitations restrict and retard improvements in the performance of contemporary printers, which operate by converting an image on a host device such as a personal computer into data that is received and stored in the printer. A formatter in the printer converts the stored image data and transmits it to a print engine in the printer that drives the mechanisms of the printer to print the image on a print medium, such as paper. Similar procedures can be followed for generating images for other purposes, such as displaying on devices like computer monitors or cell phones.

In many printer products and applications, some of the image information is modified or "corrected" by a computer microprocessor. This processing of the image information can improve the overall quality of the printed image from the printer. For example, the processing can be used to calibrate the image information to adjust for particular printer characteristics, so that the final printed image faithfully reproduces the original image. The processing can also be used to enhance the printed image to improve it over the original image, for example, by the removal of "red eye" in a photograph.

To accomplish these printing objectives, a great deal of information must be stored in the printer memory. In addition to image information, the stored information also includes printer instructions for controlling and directing the processing of the printer image data, and program routines for controlling and directing the printing operation of the printer.

Many modern electronic devices have multiple processors. This is certainly true of printers, which may, for example, have a central processing unit ("CPU") that has overall responsibility for controlling all of the printer operations, and additional processors with specialized duties and functions, such as video controllers, image processors, print engine drivers, and so forth.

In advanced printers, for any given printing operation or print job, the CPU will typically store a set of instructions in the memory to control the processing that is to be done by the other processors. As long as those instructions are stored in memory, the processors that are reading those instructions continue to read the instructions, until the instructions are cleared out of the memory. Sometimes this is desired, such as when the same process needs to be repeated several times. At other times the instructions need to be executed only once. Either way, those instructions need to be cleared from the memory after the instructions have been used, so that the instructions do not continue to be read and repeated over and over.

In other implementations, the CPU will typically initialize a new buffer before operating on the buffer. When implementing a printer language such as Postscript or PCL6, the CPU will add images to a buffer. For example, the letter 'A' needs to be placed at a specified location. The routine that places the 'A' does not know what data is in and around this location, so it uses read-modify writes to update the data in the buffer and not disturb the surrounding image information. This requires that each buffer be initialized to a known value prior to processing the printer language commands.

To clear this memory, it has been necessary for the CPU to clear each memory location individually. For example, the CPU would generate or copy a set of new memory values. The CPU would then write that set directly into the memory in order to clear the memory of the now-obsolete instructions. However, having the CPU go out and clear each memory location independently ties up much of the computational capacity of the printing system, and compromises much of the bandwidth, speed, and ability of the main CPU.

One solution is to use a more expensive, more powerful CPU. However, the historical trend in the industry has been the opposite, namely, to reduce costs and simplify systems while finding alternate ways to increase performance.

Another solution is for the CPU to use a proxy, such as a direct memory access controller ("DMA") to perform this memory task. For example, the CPU can initially prepare another memory area with the clearing pattern (e.g., all 0's), and then direct a DMA to copy the pattern to the memory area of concern whenever such is needed. However, this can require more raw memory resources. Additionally, the magnitude and quantity of the data involved can consume so much of the data bus resources that other, time-sensitive and potentially critical communication needs can be compromised, or even blocked. This can lead to crucial failures in the operation of the printer, other imaging systems, or any similarly affected memory management environment.

Thus, a need still remains for faster, more efficient, more effective, and less expensive methods and mechanisms for optimizing memory management and memory communication management. There is a particular need for improvements for use in devices that look to specific areas of memory for instructions, such as in systems used for image processing.

In view of the continuing increases in performance, capabilities, and customer expectations, accompanied by ever-increasing competition and declining prices, it is ever more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

A method for intervaled memory transfer access is provided. Periodic authorization signals are provided to a memory access controller. The method then cycles between: 1) inhibiting the memory access controller from writing data to a memory until the memory access controller receives a periodic authorization signal to cause the memory access controller to remove the inhibition and write a predetermined amount of data to the memory through a data bus, and 2) releasing the data bus following writing of the predetermined amount of data to the memory by inhibiting the memory access controller from writing further data.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

Figure 1:
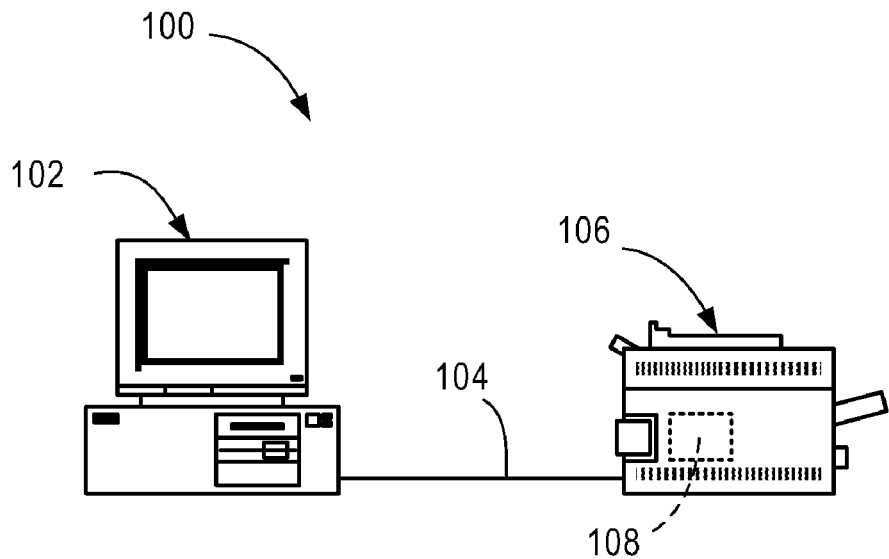
FIG. 1 is a block diagram of a printing system in accordance with an embodiment of the present invention.

In the following description, numerous specific details are given to provide a thorough understanding of the invention. However, it will be apparent to one skilled in the art that the invention may be practiced without these specific details. In order to avoid obscuring the present invention, some well-known circuits, system configurations, and processing steps are not disclosed in detail. Likewise, the drawings showing embodiments of the invention are semi-diagrammatic and not to scale and, particularly, some of the dimensions are for the clarity of presentation and are shown exaggerated in the FIGS. In addition, where multiple embodiments are disclosed and described having some features in common, for clarity and ease of illustration, description, and comprehension thereof, similar and like features one to another will ordinarily be described with like reference numerals.

As used herein, the term "printer" will be understood to encompass all image printing devices that receive a data stream representing an image and, from that data stream, print the represented image on a print medium, for example, a sheet of a paper. The term "print medium", as used herein, will be understood to encompass paper, paper-based products and sheets or planar sections of all other material on which an image may be printed. The term "print medium" will also be understood to encompass an intermediate transfer belt or similar device on which an image is built up before being transferred to another print medium.

Referring now to FIG. 1 therein is shown a block diagram of a printing system 100 in accordance with an embodiment of the present invention. The printing system 100 includes a printer host device 102, such as a personal computer (illustrated), a mainframe computer, a server, a scanner, a modem, a fax machine, a video camera, a security camera, a videocassette recorder, a digital videodisc, a laser disc player, a personal digital assistant, a wireless telephone, a mobile telephone, or any other device capable of generating or transmitting image data for printing.

The printing system 100 also includes a connection 104 that connects the printer host device 102 to a printer 106, which can be a monochrome or a color printer, for example. The connection 104 is a communication link between the printer host device 102 and the printer 106 over which the printer host device 102 can transmit image data, in the form of print jobs, to the printer 106. The connection 104 may be a direct serial or parallel connection between the printer host device 102 and the printer 106. Alternatively, the connection 104 may be over a local area network ("LAN") or a wide area network ("WAN"). The connection 104 may also be a wireless connection or any other connection over which data can be transferred from the printer host device 102 to the printer 106.

The printer host device 102 customarily runs an application that generates image data representing an image that is to be printed. The image data is transmitted to a host printer driver (not shown) that also customarily runs on the printer host device 102. The host printer driver configures the image data into a form appropriate for transmission to the printer 106 through the connection 104.

The image data is received in the printer 106 by a printer circuitry board 108 located therein. The printer circuitry board 108 provides data storage and processing circuitry for the printer 106. The processing circuitry in the printer circuitry board 108 controls the operation of the printer 106 and performs additional processing on the image data. The additional image data processing includes, for example, formatting of the image for printing, such as providing pixel-by-pixel processing of the image elements to enhance or optimize the image according to the desired effect. Such enhancement, for example, may include artifact removal (e.g., "red-eye"), single dot enhancement, line enhancement, contrast enhancement, color enhancement, resolution enhancement, color trapping, and so forth, as is known and performed in the art.

Figure 2:
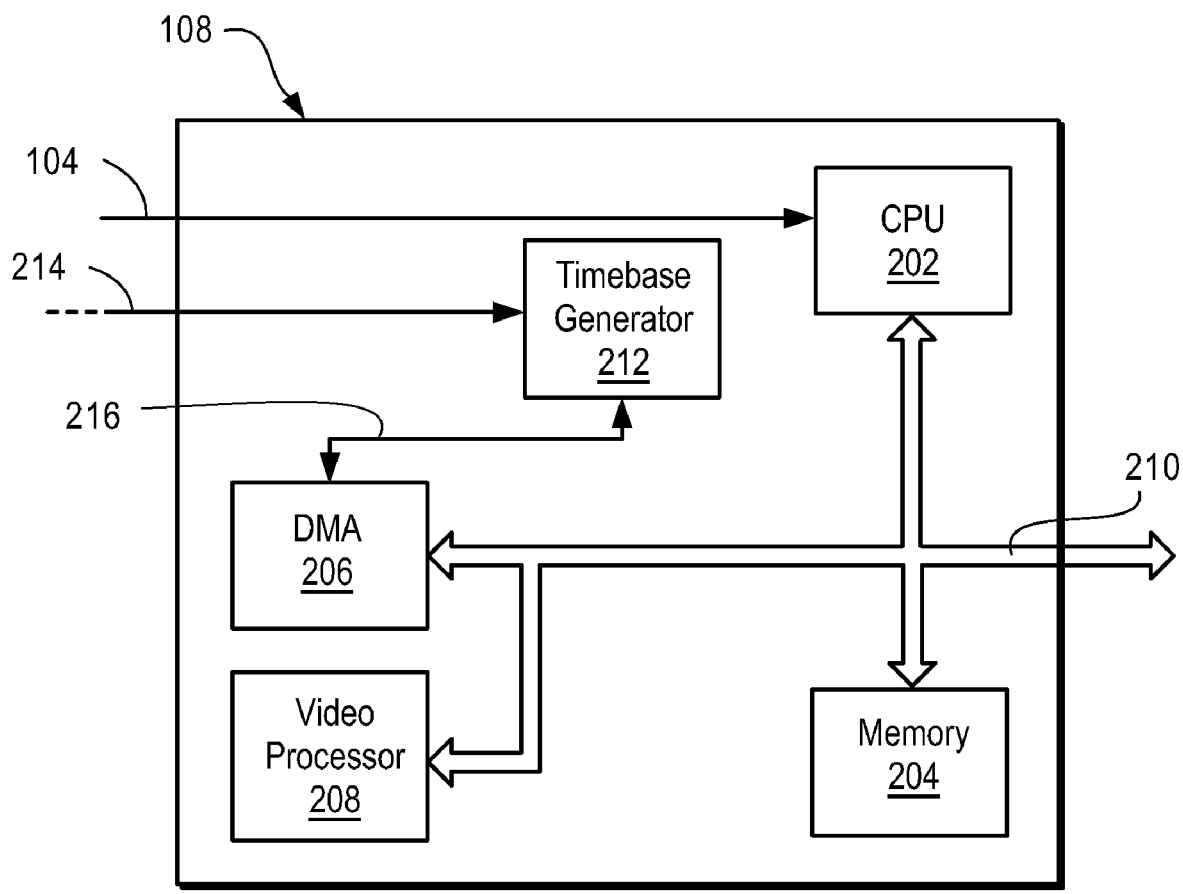
FIG. 2 is a block diagram of the printer circuitry board shown in FIG. 1.

Referring now to FIG. 2, therein is shown a block diagram of the printer circuitry board 108 of FIG. 1. The printer circuitry board 108 includes a central processing unit ("CPU") 202, which is the main processing unit for the printer 106. The printer circuitry board 108 also includes memory 204, a direct memory access controller ("DMA") 206, and a video processor 208. These are connected to and communicate with one another by and through conventional communication lines, such as a data bus 210. A timebase generator 212 is connected directly to the DMA 206. Other components, such as a power supply, etc., are also conventionally supplied on the printer circuitry board 108 but are omitted from the drawing FIG. for clarity of illustration and description.

In the operation of one embodiment of the printer circuitry board 108, for example, a page of the data that is to be printed will be transmitted by the printer host device 102 through the connection 104 to the printer circuitry board 108 in the printer 106. The CPU 202 receives the data and stores it in the memory 204 of the printer circuitry board 108. In another embodiment, the page of the data that is to be printed is transmitted from the printer host device 102 in multiple compressed "strips". Before being printed, the strips are decompressed by the CPU 202, or by a dedicated decompressor (not shown) or in-line decompression blocks (not shown), and the data is stored into the memory 204.

Before the image data is printed, it is often processed for any of various purposes, such as those described above. The image data processing can be performed by the CPU 202, but for performance, cost, and efficiency reasons, the image data processing is often performed by a dedicated video processor such as the video processor 208. By off-loading the image data processing tasks to the video processor 208, the CPU 202 is then free to perform other tasks such as receiving and converting additional image data information from the connection 104, handling networking overhead (e.g., a modem), supervising input/output ("I/O") protocols (e.g., USB), transmitting status information to the printer host device 102 and possibly additional host devices, and so forth.

The video processor 208 then reads the stored image data from the memory 204, processes it pixel by pixel, and then stores the processed data back into the memory 204. At the appropriate time, the CPU 202 or a separate video controller (not shown) then takes the processed data from the memory 204 and sends it out for printing to a printer engine (not shown) in the printer 106.

For the video processor 208 to perform its processing task, it needs instructions. Those instructions are provided by the CPU 202, which first places a suitable series of task instructions for the task at hand into the memory 204. Such tasks are often highly repetitive, so the video processor 208 may read those instructions many, many times, until the task is completed. The same will generally be true of other tasks that the CPU 202 assigns to other printer processors, such as a video controller or a printer engine, for example.

At the conclusion of the particular printing job, the memory 204 is then typically filled with the various series of instructions related to that printing job. But once the print job has finished, it is usually necessary to clear that memory 204 so the concerned processors do not continue executing the instructions that are stored there. In the past, clearing the memory 204 has been a task that the CPU 202 has had to do itself, taking processing capacity away from the other tasks that the CPU 202 could be doing. Clearing the memory 204 by means of the CPU 202 also tied up significant resources and bandwidth of the data bus 210 between the memory 204 and the CPU 202.

Additionally, to perform certain other processing tasks, the CPU 202 needs to initialize buffers stored in the memory 204 prior to using the buffers. Since each page can be comprised of many buffers, this task also takes power away from other tasks that the CPU 202 could be doing.

It has been discovered that the DMA 206, which is not a CPU, can nevertheless be used to clear the memory directly without requiring direct, continuing intervention by a CPU, such as the CPU 202. In the past, DMA's have transferred data by first receiving data and then forwarding it. When the data that is to be transferred does not exist, it must first be generated under the continuing direction and/or control of the CPU. Thus, in prior embodiments, a DMA would be able to clear the memory by transferring a repetitive pattern, such as 0's or 1's only after that particular pattern was generated and/or copied into the memory, typically by the CPU. It was therefore the CPU itself that generated or provided the clearing pattern, reducing the ability of the CPU to perform other tasks.

However, it has been discovered that it is possible to specially configure the DMA 206 to perform the memory clearing task without tying up the CPU 202. To accomplish this, the DMA 206 itself generates the clearing pattern and backfills or writes-back the pattern into the memory starting at a specified location and continuing for a specified length of the addressing space of the memory. As used herein, the term "generate" means that more write-back data is provided ("generated") by the DMA 206 than is provided to it. This contrasts with a conventional DMA memory or data transfer operation, in which the conventional DMA reads in and writes out equal amounts of data, whereas here, the DMA 206 itself generates (or originates) most if not all of the data that is written out to the memory 204.

The instructions for the desired write-back pattern, starting location, and the length of the addressing space of the memory to be written to are initially provided to the DMA 206 by the CPU 202, such as through the data bus 210. The DMA 206 then takes over and rapidly clears the memory 204 without further supervision by the CPU 202, and without additional delays and overhead from first having to read-in all the write-back pattern clearing data (and possibly having to wait for that data to first be generated elsewhere, as by a CPU, and then placed into memory in order to be read by the DMA).

However, although this unique DMA-generated memory write-back saves and releases significant CPU resources for other tasks, it can also impose significant burdens and data loads on internal communication resources, such as the data bus 210. Thus, when a large amount of memory (e.g., hundreds of lines of data) is to be overwritten in memory by the DMA 206, the DMA 206 will ordinarily try to accomplish the entire task as quickly as possible, thereby bursting the data across the data bus 210 with as many consecutive transfers as it can. While this data transfer is taking place, the data bus 210 will be tied up and unavailable to other devices. During such a time, there may be other critical operations that need to be performed, such as data communications (e.g., modem), print engine management, FAX protocol management, and so forth. If the DMA 206 ties up the data bus at such times, other critical operations such as these may fail, resulting in poor overall device performance and printing failures.

It has been discovered, as taught herein, that the DMA 206 can be configured according to the teachings of the present invention to allow critical resources and operations to continue while still conducting the DMA-generated memory write-back as needed. This is accomplished by configuring the DMA 206 to make intervaled DMA transfer access to the data bus 210 for accommodating other devices on the data bus 210.

Thus, the operation of the DMA 206 is modified or governed by the timebase generator 212 to periodically release the data bus 210, at intervals, during the conduct of the data transfer (e.g., memory write-back) as the data transfer is being performed by the DMA 206. In this manner, the DMA access for the data transfer occurs at set intervals, accordingly providing and operating in an intervaled DMA transfer access protocol.

To support this intervaled DMA transfer access according to the present invention, the timebase generator 212 includes a counter that counts a certain number of clock cycles. The clock cycles can be internally generated in the timebase generator 212. More commonly, however, the clock cycles are the customary general system timing signals, provided to the timebase generator 212 on a timing line 214 by the system clock (not shown) that synchronizes (not shown) the operation of the CPU 202 and the other computational and communication resources of the printer 106. The timebase generator 212 may be any known such generator as appropriate to the particular embodiment of the present invention that is being implemented.

In one embodiment, the timebase generator 212 counts the number of clock cycles on the timing line 214 and provides an output, such as on an output line 216, to the DMA 206, when a set number of clock cycles has occurred. Knowing the frequency of the clock, it is then possible to provide an output on the output line 216 at any desired time interval according to the number of clock cycles that is set to be counted in the timebase generator 212.

The circuitry of the DMA 206 is then configured to inhibit its write-back until it receives a signal on the output line 216 from the timebase generator 212. That signal on the output line 216 is an authorization signal that causes the DMA 206 to remove the inhibition and to conduct one cycle of writing data (e.g., write-backs) to the memory 204. The amount of data that is allowed to be written in each such DMA cycle interval can be fixed in the DMA 206, or if desired can be programmed into the DMA 206 for any particular memory writing job. The amount of data that is written in one of these intervaled cycles can be a single data value (e.g., a single 0), or multiple data value writes (e.g., a string of 0's). Typically, however, the amount of data that is allowed to be written in each cycle will be considerably less than the total quantity or size of the memory writing job assigned to the DMA 206.

Upon concluding an authorized data write cycle, the DMA 206 then inhibits itself again for another interval, until it receives another authorization signal on the output line 216. This inhibition causes the DMA 206 to stop writing and to release the data bus 210 from the DMA's control, thereby beneficially making the data bus 210 available to other devices, such as the CPU 202. By cycling in this intervaled manner between write cycles and write inhibitions, the resources of the data bus 210 are repeatedly and frequently released by the DMA 206 and made available at set intervals for other devices, so that critical operations that need to use the data bus 210 can timely proceed as needed.

One embodiment of the present invention provides high performance and efficiency by writing very small amounts of data on each intervaled data write cycle and causing the timebase generator 212 to generate an authorization signal for the DMA 206 at a high rate, such as once every microsecond. This rapidly intervaled DMA transfer access keeps the DMA 206 busy completing its task as long as the data bus 210 is available. However, it also efficiently accommodates the needs of other devices to access the data bus 210 since the intervaled DMA transfer access causes the DMA 206 to release the data bus 210 at a high cycle rate.

If the data bus is busy on the next authorization signal from the timebase generator 212, the DMA 206 may then just wait until the data bus becomes available, or may skip a cycle or interval, as designated according to the needs at hand, since the DMA 206 observes the usual protocol of not seizing the data bus 210 when the data bus is in use by another device. Instead, in those cases wherein the data bus 210 is not available when the timebase generator 212 produces an authorization signal on the output line 216, the DMA 206 is configured to simply ignore that particular authorization signal, to remain inhibited, and either to wait for the data bus to become available, or wait for the next authorization signal, as designated. In this fashion, the DMA 206, with the assistance of the timebase generator 212, assigns itself a low task priority and automatically and frequently yields the data bus 210 at regular intervals to other uses as needed, while still making maximum use of the available data bus resources to complete its tasks as quickly as possible.

Thus, the present invention enables the DMA 206, by virtue of its intervaled DMA transfer access, to prevent itself from monopolizing the data bus 210.

In another embodiment, the DMA 206 may be allowed to transfer larger amounts of data in each data transfer cycle interval. In that case, it is possible that another authorization signal could be received from the timebase generator 212 while a data transfer was still in progress. Therefore, to assure that the DMA 206 will continue to operate on an intervaled basis and will accordingly release the data bus 210 at the conclusion of the data transfer cycle that is in progress, the DMA 206 is configured, in this embodiment, to ignore any such authorization signal that arrives while it is not inhibited. As a result, the DMA 206 will again inhibit itself at the conclusion of the data transfer cycle, release the data bus 210, and wait for another (later) authorization signal from the timebase generator 212 on the output line 216. Thus the data bus 210 will continue to be made available at intervals to other devices that may need it.

Figure 3:
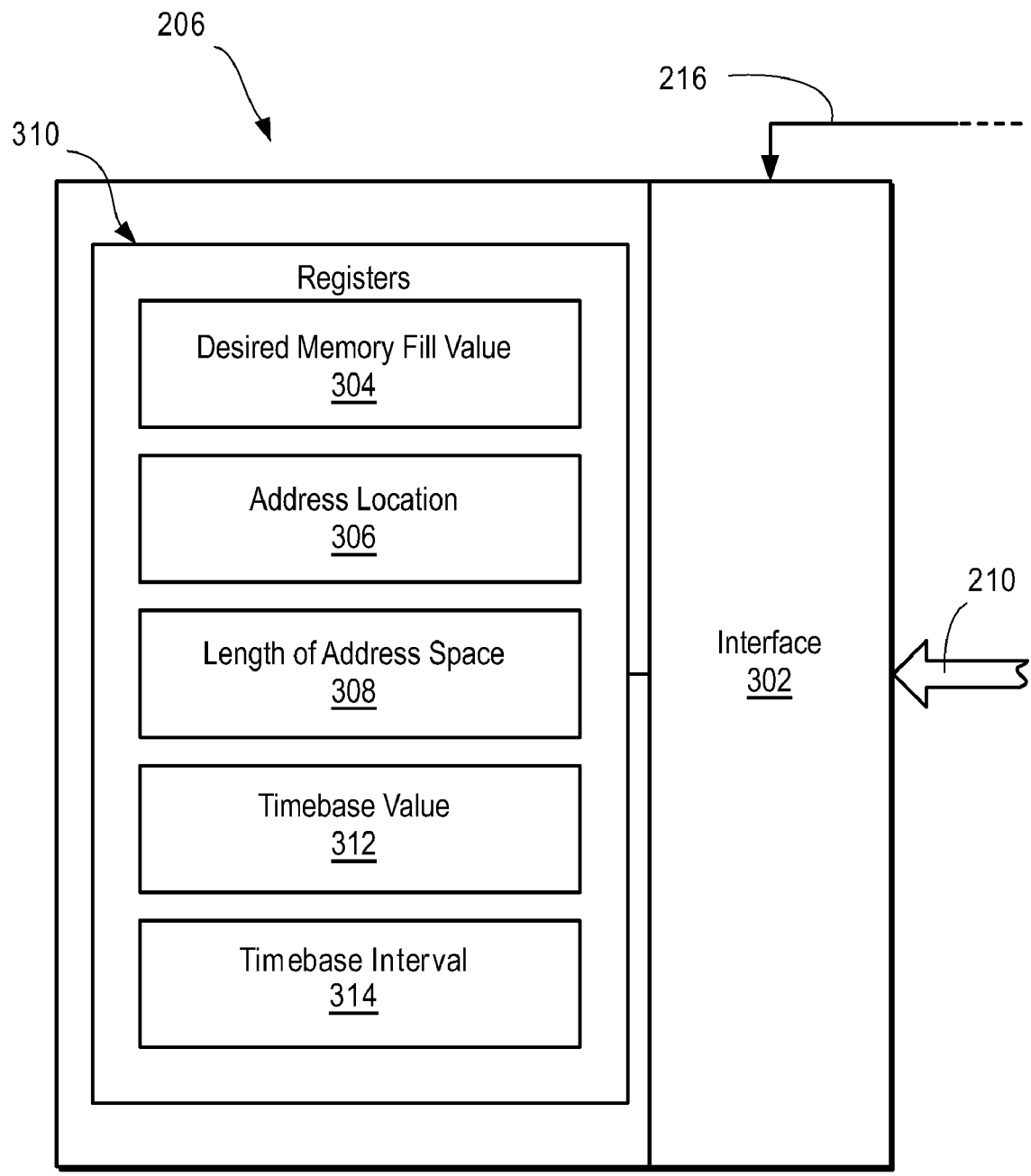
FIG. 3 is a block diagram of the direct memory access controller shown in FIG. 2.

Referring now to FIG. 3, therein is shown a block diagram of the DMA 206 shown in FIG. 2. The DMA 206 includes an interface 302 connecting to the data bus 210 and the output line 216, and through them to the remainder of the printer circuitry board 108 (FIG. 2). Using the interface 302, the DMA 206 has the customary ability to either pull data from the memory 204 (FIG. 2) or put data into the memory 204, using a conventional DMA internal storage area (not shown) for holding data during such a typical pull-put memory-move operation. In known fashion, this enables the CPU 202 (FIG. 2) to command the DMA 206 to move data from one location to another in the memory 204 without requiring continuing use of the immediate resources of the CPU 202 itself. Instead, the CPU 202 needs only, for example, to specify the address location in the memory 204 to begin reading from, the length of the address space to be read, and the beginning address location where the data is then to be written to. The DMA 206 then completes the memory-move task on its own, releasing the CPU 202 resources for other tasks. Operation of the DMA 206 in this known manner can be referred to as "normal mode".

The DMA 206 of the present invention can accomplish the memory clearing task much more efficiently by operating in another, unique mode that omits (e.g., by bypassing) the conventional DMA operation that first fetches data from the memory 204. Instead, as taught herein, the CPU 202 specifies a desired memory fill value 304 (e.g., all 0's, or another desired pattern) for the memory write-back clearing operation, an address location 306 in the memory 204 to begin writing back to, and a length 308 of the address space into which the memory fill value is to be written. These parameters can all be stored in various registers 310 in the DMA 206. The DMA 206 then repeatedly generates those memory fill values and writes them back consecutively to the corresponding memory address locations, as specified by the corresponding parameters in the registers 310. Operation of the DMA 206 in this manner can be referred to as "memory clearing mode" or "memory patterning mode", depending upon the nature and pattern of the write-back data.

In order to control the operation of the timebase generator 212 (FIG. 2), parameters such as a timebase value 312 and a timebase interval 314 can also be stored in the registers 310 for transmission through the output line 216 to the timebase generator 212. The timebase value 312 in one embodiment, for example, would be the interval scale, such as milliseconds, microseconds, nanoseconds, and so forth. The timebase interval 314 would then be, for example, the time between authorization signals on the output line 216, in terms of the timebase value 312. Thus, for example, to program the DMA 206 to perform a write-back of 0 at a rate of one write-back cycle every 3 microseconds, the value '0' would be loaded into the memory fill value 304, the timebase value 312 would be set at 'microseconds', and the timebase interval would be set at '3'.

Operation of the DMA 206 in this intervaled transfer access manner, using the write-back inhibition capability of the DMA 206 with the assistance of the timebase generator 212 as described above, can be referred to as "low-priority mode". It will be understood that the low-priority mode may be the exclusive operating mode for controlling access of the DMA 206 to the data bus 210.

Alternatively, the low-priority mode may be available in the DMA 206 as another mode in addition to the known conventional mode in which the DMA executes its entire task before releasing the data bus 210. Operation of the DMA 206 in the conventional mode wherein it executes its entire task before releasing the data bus 210 can be referred to as "standard-priority mode".

By incorporating both the low-priority mode and the standard-priority mode, it is possible to select one mode or the other for a particular assigned DMA task according, for example, to the priority or urgency of the particular assigned task.

Thus, an embodiment of the invention incorporating all the described modes would be able to operate in four mode states: normal, standard-priority mode; normal, low-priority mode; memory patterning, standard-priority mode; and memory patterning, low-priority mode.

Thus, in one embodiment, the CPU 202 instructs the DMA 206 to operate in the normal, standard-priority mode when a conventional memory transfer task is to be effected, and to operate in the memory patterning, low-priority mode when a memory clearing task is to be effected. When in the normal, standard-priority mode, the DMA 206 then obtains the memory data values externally, such as from the memory 204, according to the instructions that are provided to it. When in the memory patterning, low-priority mode, the DMA 206 generates the memory data values internally and then writes them back to the memory 204 according to the instructions that are provided to the DMA 206. In the latter case, the overhead load on the CPU 202 and traffic collisions on the data bus 210 are minimized, and a much more efficient and cost-effective performance improvement is afforded without requiring exotic or higher-cost computational components.

Based on the disclosure of the embodiments of the present invention, it will now be clear to one of ordinary skill in the art that various modifications can readily be made to enhance the versatility and power of the present invention. For instance, the present invention can be utilized for memory filling in addition to memory clearing. For example, the CPU 202 can specify a repeating write-back data pattern as the memory fill value 304 of the DMA 206, and the repeating data pattern can then be filled into a specified memory space by the DMA 206 without further supervision by the CPU 202. The pattern that is to be repeated can be a standard pattern that is programmed into the DMA 206, or it can be a certain pattern that is loaded by the CPU 202 into a register of the DMA 206, for the particular memory write-back filling operation that is utilized for this memory patterning mode operation. When the write-back data pattern is not of a high priority, it can be effected without detrimentally denying data bus access to other system components, for example, by operating in the low-priority mode.

It will similarly be understood that the functions of the timebase generator 212, or the timebase generator 212 itself, may be incorporated in whole or in part into the DMA 206, as may be desired, needed, or appropriate for the particular configuration at hand.

Still another modification that can be made is for the DMA 206 to determine whether or not the data bus 210 has been free or busy for a certain period of time, and then to dynamically adjust its access to and utilization of the data bus 210 accordingly. For example, it could make a statistical determination that the data bus has been free for an appropriately long period of time and then increase its data bus utilization accordingly, and vice versa. This could be accomplished by dynamically changing the amount of data that is transferred in each data transfer cycle interval.

Figure 4:
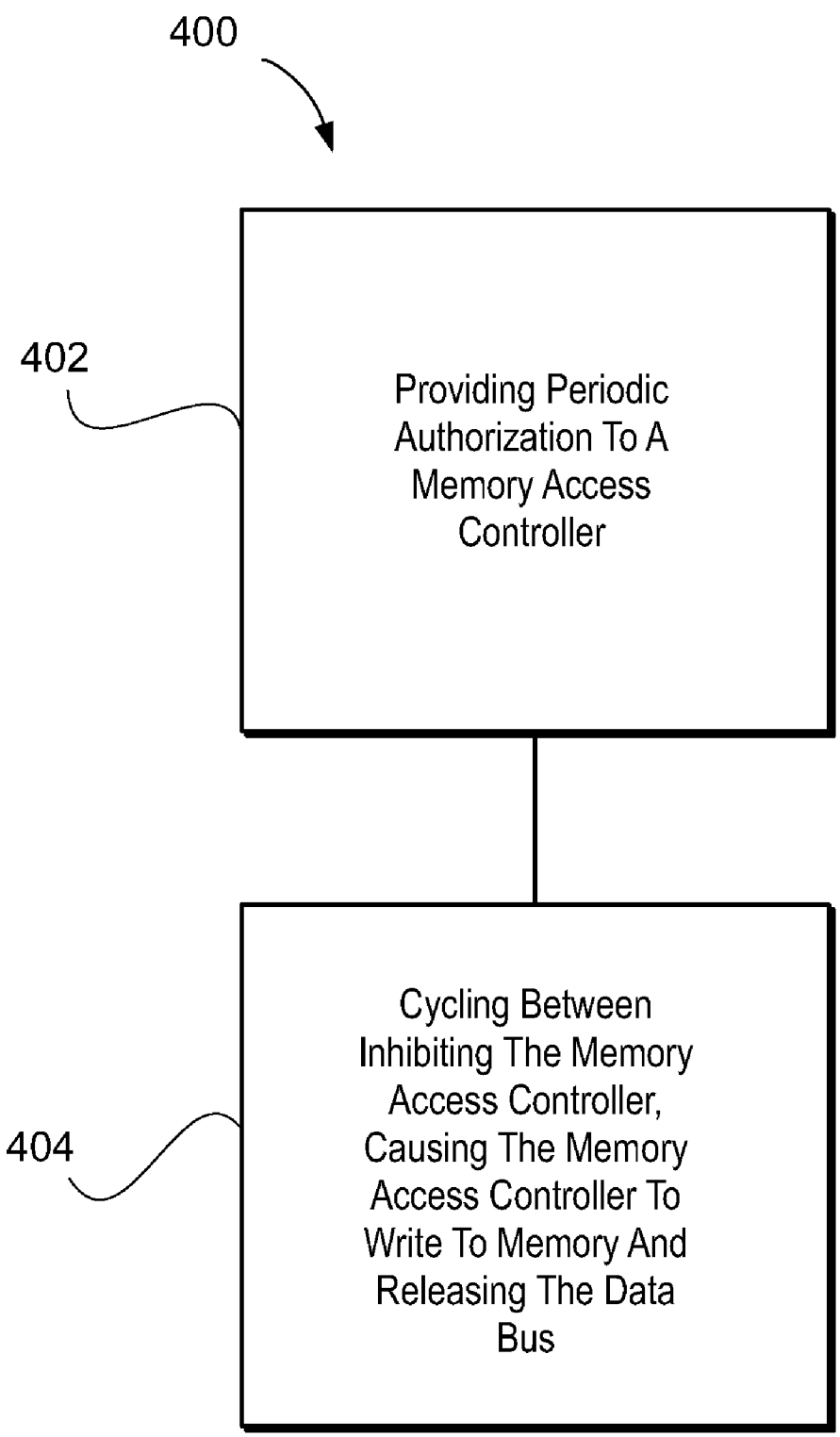
FIG. 4 is a flow chart of a method for intervaled DMA transfer access in accordance with the present invention.

Referring now to FIG. 4, therein is shown a flow chart of a method 400 for intervaled memory transfer access in accordance with the present invention. The method 400 includes providing periodic authorization signals to a memory access controller, in a block 402; and cycling between inhibiting the memory access controller from writing data to a memory until the memory access controller receives a periodic authorization signal to cause the memory access controller to remove the inhibition and write a predetermined amount of data to the memory through a data bus, and releasing the data bus following writing of the predetermined amount of data to the memory by inhibiting the memory access controller from writing further data, in a block 404.

It has been discovered that the present invention thus has numerous aspects.

A principle aspect is that the present invention prevents the DMA from monopolizing the data bus.

Accordingly, another major aspect of the present invention is that it provides for highly efficient, intensive data bus utilization by the DMA while at the same time affording regular and frequent intervaled, inter-task data bus access by other devices.

The present invention thus assures that the DMA will not interfere with time-sensitive and potentially critical communication needs of other devices in the system.

Another major aspect of the present invention is that it provides faster, more efficient, more effective, and less expensive methods and mechanisms for optimizing memory management, particularly for, but not limited to, image processing.

A particular aspect is that the CPU does not need to go out and clear each memory location independently, so that the computational capacity of the CPU is not compromised yet its access to the data bus is protected notwithstanding that the task has been delegated to another device on the data bus.

Accordingly, another aspect of the present invention is that the main CPU is not delayed or prevented from performing other, more important tasks that it needs to perform, for example for a printer, so that the overall printing system is not slowed, since the bandwidth, speed, and ability of the main CPU are not compromised.

Thus, an additional aspect is that substantial CPU resources remain available for servicing the remainder of a printing system, not only thereby avoiding slowdowns, but in fact enabling improvements in printer performance without the increased costs of higher performance components.

Another aspect of the present invention is that it is not limited just to use in printers, but can also be beneficially applied to image processing for the full range of image generation and display technologies.

Accordingly, yet another aspect of the present invention is that, in addition to use in printers, the present invention can be used as well for image processing in display devices such as computer displays, cell phones, video cameras, personal digital assistants, and so forth.

Still another aspect is that the intervaled DMA transfer access method and apparatus of the present invention can be utilized in fact in virtually any memory management environment or protocol, not necessarily limited to image processing.

Thus, an additional aspect is that the present invention can be used wherever a certain write-back data pattern needs to be written to or filled into a memory space, without tying up, and without requiring detailed supervision by, a main CPU, and without tying up the system data bus.

Yet another important aspect of the present invention is that it can in fact be used in processing environments not limited to those utilizing a CPU, but rather can be used with any appropriate implementation employing a suitable bus configuration.

Yet another important aspect of the present invention is that it valuably supports and services the historical trend of reducing costs, simplifying systems, and increasing performance.

These and other valuable aspects of the present invention consequently further the state of the technology to at least the next level.

Thus, it has been discovered that the intervaled DMA transfer access method and apparatus of the present invention furnish important and heretofore unknown and unavailable solutions and capabilities for increasing image processing speeds and significantly reducing delays caused by main memory access, data bus access, and memory management. Savings and benefits are also realized through reduced hardware and computational resource needs. Further, the resulting processes and configurations are straightforward, economical, uncomplicated, highly versatile and effective, can be implemented by adapting known technologies, and are thus readily suited for incorporation into the widest variety of printing devices, display devices, and memory management environments in general.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the scope of the included claims. All matters hithertofore set forth herein or shown in the accompanying drawings are to be interpreted in an illustrative and non-limiting sense.

What is claimed is:

1. A method for accessing a data bus to transfer data into a memory, wherein the memory is in communication with the data bus, the method comprising:
   periodically receiving an authorization signal at a predetermined interval; and
   during each predetermined interval, in response to receiving the authorization signal, determining whether the data bus is available for transfer of data into the memory,
      if the data bus is available, (i) writing a predetermined amount of the data into the memory over the data bus, and (ii) releasing the data bus after having written the predetermined amount of the data into the memory, and
      if the data bus is not available, (i) waiting for the data bus to become available during the predetermined interval, and (ii) in response to the data bus becoming available during the predetermined interval, (a) writing the predetermined amount of the data into the memory, and (b) releasing the data bus after having written the predetermined amount of the data into the memory.

2. The method of claim 1, wherein:
the data to be written into the memory comprises a pattern to clear a portion of the memory; and
writing a predetermined amount of the data comprises writing a predetermined amount of the pattern into the portion of the memory to be cleared.

3. The method of claim 2, wherein writing a predetermined amount of the pattern comprises writing less than all of the pattern into the portion of the memory to be cleared.

4. The method of claim 1, wherein writing a predetermined amount of the data comprises generating the predetermined amount of data.

5. The method of claim 1, wherein subsequent to releasing the data bus after having written the predetermined amount of the data into the memory, inhibiting access to the data bus for a remainder of the predetermined interval to prevent further writing of the data into the memory.

6. A system comprising:
   a data bus;
   a memory in communication with the data bus, the memory configured to store an instruction;
   a direct access memory controller configured to write a pattern into the memory to clear the instruction from the memory, wherein the direct access memory controller is configured to access the data bus to write the pattern into the memory by
      periodically receiving an authorization signal at a predetermined interval, and
      during each predetermined interval, in response to receiving the authorization signal, determining whether the data bus is available to the direct memory access controller, and
         if the data bus is available to the direct memory access controller, the direct memory access controller is configured to (i) write a predetermined amount of the pattern into the memory over the data bus, and (ii) release the data bus after having written the predetermined amount of the pattern to the memory, and
         if the data bus is not available to the direct memory access controller, the direct memory access controller is configured to (i) wait for the data bus to become available during the predetermined interval, and (ii) in response to the data bus becoming available during the predetermined interval, (a) the direct memory access controller is configured to (a) write the predetermined amount of the pattern into the memory, and (b) release the data bus after having written the predetermined amount of the pattern into the memory.

7. The system of claim 6, wherein the direct memory access controller is configured to generate the pattern to be written into the memory.

8. The system of claim 6, wherein:
the system comprises a printer configured to print an image;
the instruction stored in the memory is an instruction related to printing the image; and
the direct memory access controller is configured to write the pattern into the memory to clear the instruction from the memory subsequent to the printer having printed the image.

9. The system of claim 6, further comprising a timebase generator configured to periodically provide the authorization signal at the predetermined interval to the direct memory access controller.

10. The system of claim 6, wherein the direct memory access controller is configured to generate the pattern to be written into the memory.

11. The system of claim 6, wherein subsequent to the direct memory access controller releasing the data bus after having written the predetermined amount of the pattern into the memory, the direct memory access controller is inhibited from accessing the data bus for a remainder of the predetermined interval.

* * * * *